United States Patent
Koyama et al.

(10) Patent No.: US 8,376,554 B2
(45) Date of Patent: Feb. 19, 2013

(54) PROJECTOR HAVING A DYNAMICALLY POSITIONED SHUTTER

(75) Inventors: Mika Koyama, Matsumoto (JP); Masayuki Okoshi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 319 days.

(21) Appl. No.: 12/700,162

(22) Filed: Feb. 4, 2010

(65) Prior Publication Data
US 2010/0201957 A1  Aug. 12, 2010

(30) Foreign Application Priority Data
Feb. 9, 2009  (JP) ................................. 2009-027445

(51) Int. Cl.
G03B 21/14  (2006.01)
(52) U.S. Cl. ......................................................... 353/88
(58) Field of Classification Search ............. 353/88–93, 353/119; 396/448; 359/511, 227–236; 348/740; 352/76, 204–220
See application file for complete search history.

(56) References Cited

U.S. PATENT DOCUMENTS

| | | | | |
|---|---|---|---|---|
| 5,495,290 A | * | 2/1996 | Choi | 348/333.08 |
| 5,541,696 A | * | 7/1996 | Bittner | 396/448 |
| 6,305,852 B1 | * | 10/2001 | Suzuki et al. | 396/349 |
| 2008/0094582 A1 | * | 4/2008 | Nakagawa et al. | 353/61 |

FOREIGN PATENT DOCUMENTS

| | | |
|---|---|---|
| JP | U-61-201380 | 12/1986 |
| JP | A-2008-102376 | 5/2008 |
| JP | A 2008-216757 | 9/2008 |

* cited by examiner

*Primary Examiner* — Thanh Luu
*Assistant Examiner* — Renee Naphas
(74) *Attorney, Agent, or Firm* — Oliff & Berridge, PLC

(57) ABSTRACT

A projector includes: a projection optical device; an exterior housing; a shutter; and a support member, the shutter and support member are provided with an engagement structure including an engagement protrusion which being provided on either one of them, protrudes along a vertical axis, and an engagement groove which being provided on the other, and extending in a direction in which the shutter moves, guides a movement of the engagement protrusion by the engagement protrusion being inserted therein, and the engagement groove is provided in such a way that a start end at which the engagement protrusion is positioned in the closed position is positioned to the projection optical device projection side of a finish end at which the engagement protrusion is positioned in the open position.

6 Claims, 9 Drawing Sheets

PROJECTOR HAVING A DYNAMICALLY POSITIONED SHUTTER

BACKGROUND

1. Technical Field

The present invention relates to a projector.

2. Related Art

Heretofore, a projector has been known on which a shutter is mounted in such a way as to close an image opening section (a luminous flux passage opening section) formed in an exterior housing for the purpose of protecting a projection optical device (a projection lens) (refer to, for example, JP-A-2008-216757).

With a projector described in JP-A-2008-216757, a shutter, being configured so as to be movable linearly along the rear surface of a front section of an exterior housing in which an image opening section is formed, opens and closes the image opening section by moving.

However, with the projector described in JP-A-2008-216757, as the shutter moves linearly along the rear surface of the front section, in the event that a member is disposed on the rear surface of the front section, the shutter is likely to interfere mechanically with the member when it moves. Because of this, there is a problem in that it is difficult to dispose a member, such as, for example, a remote control light receiving section for receiving a light signal emitted from a remote controller, on the rear surface of the front section.

That is, as a disposition position of a member such as the remote control light receiving section is limited, a degree of freedom in designing the projector decreases.

SUMMARY

An advantage of some aspects of the invention is to provide a projector which can protect a projection optical device without a degree of design freedom decreasing.

A projector of one aspect of the invention is directed to a projector including a projection optical device configured to project an image; an exterior housing include an image opening section for allowing the image projected from the projection optical device to pass through; a shutter which being disposed inside the exterior housing, closes the image opening section; and a support member configured to support the shutter in a closed position in which the image opening section is closed, or in an open position in which the image opening section is opened, causing the projection optical device to be exposed through the image opening section, in such a way that the shutter is movable. The shutter and support member are provided with an engagement structure including an engagement protrusion which being provided on either one of them, protrudes along a vertical axis, and an engagement groove which being provided on the other, and extending in a direction in which the shutter moves, guides a movement of the engagement protrusion by the engagement protrusion being inserted therein. The engagement groove is provided in such a way that a start end at which the engagement protrusion is positioned in the closed position is positioned to the projection optical device projection side of a finish end at which the engagement protrusion is positioned in the open position.

With the aspect of the invention, by means of the engagement structure provided on the shutter and support member, the shutter, while the engagement protrusion is being guided by the engagement groove, that is, by moving along the engagement groove, opens and closes the image opening section. Herein, the engagement groove is provided in such a way that the start end is positioned to a projection side (the side of a sidewall (hereafter described as a front section) of the exterior housing in which the image opening section is formed) of the finish end.

By this means, the shutter, when it is positioned in the open position, is positioned farther to a side opposite to the projection direction, that is, on a side farther away from the front section, than in a condition in which the shutter is positioned in the closed position. That is, as the shutter, when it moves from the closed position to the open position, moves in such a way as to go away from the front section, even in the event that a member such as a remote control light receiving section is disposed on the rear surface of the front section, it is possible to realize a configuration such that the shutter does not interfere mechanically with the member when the shutter moves.

Consequently, it not happening that a disposition position of a member such as the remote control light receiving section is limited, it does not happen that a degree of freedom in designing the projector decreases.

Also, by configuring in the way heretofore described, it also being possible to form an area of the front section in which the image opening section is formed into a shape bulging more in the projection direction than the other area, it is also possible to increase a degree of freedom in designing the exterior housing.

With the projector of the aspect of the invention, it is preferable that the engagement groove is configured of a first groove section and second groove section configured to communicate with each other, and that the second groove section is formed in such a way as to extend from the finish end so as to be approximately perpendicular to a projection direction of the projection optical device, the first groove section is formed in such a way as to form an obtuse angle with respect to the second groove section, and extend to the finish end.

With the aspect of the invention, the engagement groove is configured of the first groove section and second groove section configured to form an obtuse angle and communicate with each other. By this means, as the engagement protrusion moves smoothly along the engagement groove (first groove section and second groove section), a user can move the shutter smoothly. Because of this, it is possible to enhance an operability of the shutter.

With the projector of the aspect of the invention, it is preferable that the engagement groove is formed in such a way that the length of the first groove section is shorter than that of the second groove section.

With the aspect of the invention, as the first groove section is formed in such a way as to be shorter than the second groove section, the shutter moves from the closed position to the side away from the front section at an early stage, then moves approximately parallel to the front section, and is positioned in the open position. By this means, even in the event that, on the rear surface of the front section, a member such as the remote control light receiving section is disposed close to the image opening section, it does not happen that the shutter interferes mechanically with the member when the shutter moves. Consequently, it is possible to more preferably achieve the heretofore described advantage that the degree of freedom in designing the projector does not decrease.

With the projector of the aspect of the invention, it is preferable that the shutter includes a bulging section which, bulging in the projection direction of the projection optical device, is loosely fitted into the image opening section when the shutter is positioned in the closed position.

In this respect, with the existing configuration, as the shutter moves along the rear surface of the front section, the shutter, when it is positioned in the closed position, is disposed in a position receding by an amount equal to the width of the front section inward from the outer surface of the front section across the image opening section. This kind of configuration is not preferable in appearance as the edge portion of the image opening section becomes visible even in the event that the image opening section is closed by the shutter.

With the aspect of the invention, as the shutter includes the bulging section, in the condition in which the image opening section is closed by the shutter, condition is attained in which the bulging section is loosely fitted in the image opening section. By this means, the edge portion of the image opening section becoming difficult to be noticed due to the bulging section, it is possible to provide a configuration preferable in appearance.

With the projector of the aspect of the invention, it is preferable that the leading end portion of the bulging section is configured of a surface which, when the bulging section is loosely fitted into the image opening section, follows the outer surface of a sidewall of the exterior housing in which the image opening section is formed.

With the aspect of the invention, the leading end portion of the bulging section is configured of the heretofore described kind of surface. By this means, in the condition in which the image opening section is closed by the shutter, the surface of the leading end portion of the bulging section loosely fitted in the image opening section, and the outer surface of the front section, are positioned approximately flush with each other. Because of this, it is possible to provide a configuration more preferable in appearance.

With the projector of the aspect of the invention, it is preferable that the image opening section is formed in such a way that the opening area increases toward the inside of the exterior housing.

With the aspect of the invention, as the image opening section is formed in the way heretofore described, even in the event that the bulging section is formed on the shutter, it does not happen that the bulging section interferes mechanically with the edge portion of the image opening section when the shutter moves. Because of this, the user can move the shutter smoothly.

With the projector of the aspect of the invention, it is preferable that the exterior housing which being formed therein an operation opening section for moving the shutter, includes an operating member which being configured so as to be movable, as well as being exposed to the outside through the operation opening section, moves the shutter by being operated from outside, and that the shutter and operating member are provided with a second engagement protrusion provided on either one of them which protrudes in the projection direction of the projection optical device, and a second engagement structure include a through hole provided in the other which being inserted the second engagement protrusions With the aspect of the invention, by means of the second engagement structure provided in the shutter and operating member, the shutter interlocks with movement of the operating member. Herein, the second engagement structure includes the second engagement protrusion which protrudes in the projection direction, and the through hole through which the second engagement protrusion is inserted.

By this means, for example, in the event that the through hole is provided in the operating member, and that the second engagement protrusion is provided on the shutter, when the shutter moves close to or away from the front section along with the movement to the closed position or open position, the second engagement protrusion withdraws in the condition in which it is inserted through the through hole.

Consequently, by employing the second engagement structure, there is no need to employ a structure in which the operating member moves in accordance with the movement of the shutter (the movement close to or away from the front section along with the movement to the closed position or open position). That is, with respect to the operating member, it being sufficient to form a structure causing it to move linearly, it is possible to achieve a structural simplification.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
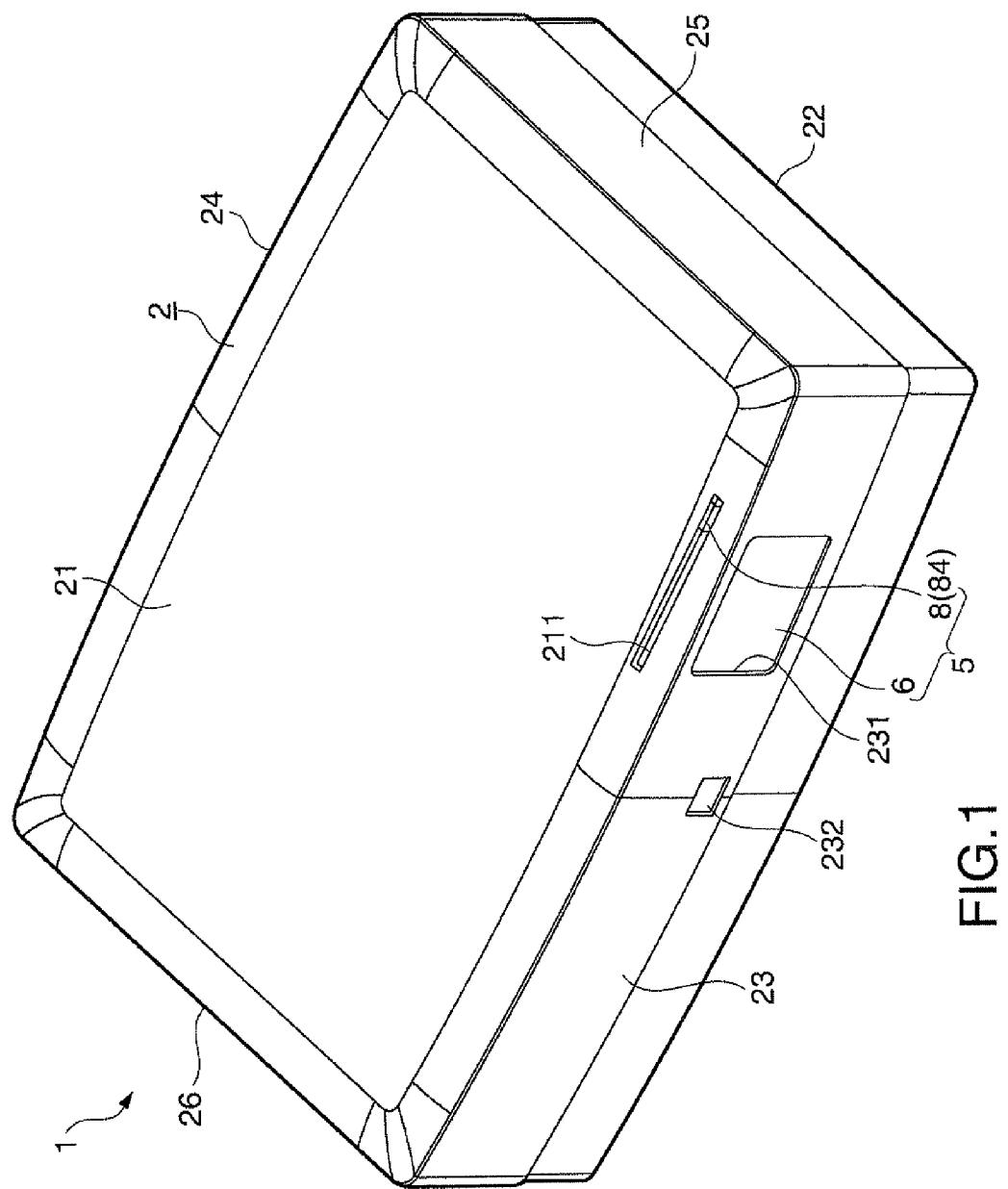
FIG. 1 is a perspective view showing an exterior of a projector of an embodiment.

Hereafter, a description will be given, based on the drawings, of an embodiment of the invention,
Configuration of Projector FIG. 1 is a perspective view showing an exterior of a projector 1 of the embodiment. Specifically, FIG. 1 is a perspective view of the projector 1, as seen from the upper front side.

"Up", "down", "left", and "right", used hereafter, correspond to up, down, left, and right when viewed in FIG. 1. Also, with regard to "front" and "back", to be described hereafter, a projection side (a side on which a projection lens 36 is disposed) is taken to be the front, and the opposite side is taken to be the back, in the projector 1.

The projector 1 forms an image according to image information, and projects it onto a screen (not shown). As shown in FIG. 1, the projector 1 is roughly configured of an exterior housing 2 configuring an exterior, an optical unit 3 (refer to FIG. 2) housed inside the exterior housing 2, a remote control light receiving section 4 (refer to FIG. 2), and a lens protection device 5.
Configuration of Exterior Housing The exterior housing 2, including a top section 21 and bottom section 22, and a front section 23, back section 24, right side section 25, and left side section 26 which intersect therewith in a vertical direction, has an approximately rectangular parallelepiped shape, as shown in FIG. 1.

In the exterior housing 2, as shown in FIG. 1, an image opening section 231 for allowing the image projected from the projection lens 36, to be described hereafter, of the optical unit 3 to pass through is formed on the right side of the front section 23.

The front section 23 has a convex curve shape, a central portion in a left-right direction of which bulges slightly toward the front side, as shown in FIG. 1. Because of this, the opening face of the image opening section 231 is tilted in such a way as to go toward the back side from the left to the right.

Also, as shown in FIG. 1, a light receiving window 232 for allowing a light signal emitted from an external remote controller (not shown) to pass through is formed to the left side of the image opening section 231.

Furthermore, in the exterior housing 2, as shown in FIG. 1, an operation opening section 211 for causing an operating member 8, to be described hereafter, of the lens protection device 5 to be exposed to the outside is formed on the front right side of the top section 21.

The operation opening section 211 is configured of a slit extending in the left-right direction.

Configuration of Optical Unit

Figure 2:
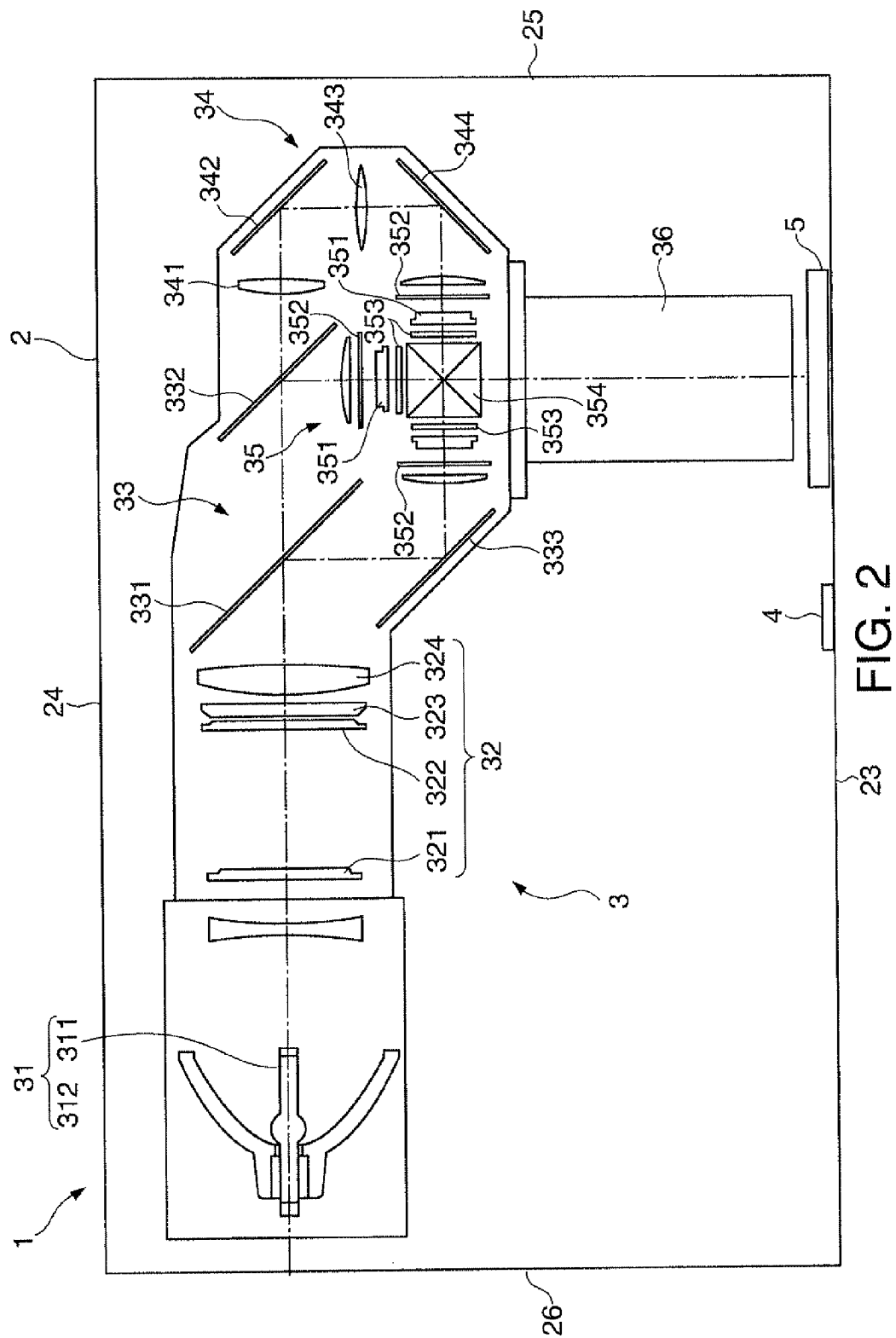
FIG. 2 is a diagram schematically showing an internal configuration of the projector of the embodiment.

FIG. 2 is a diagram schematically showing an internal configuration of the projector 1.

The optical unit 3 forms and projects the image in accordance with the image information (an image signal) under a control by a control device (not shown).

As shown in FIG. 2, the optical unit 3 includes a light source device 31, which has a light source lamp 311 and a reflector 312, an illumination optical device 32, which has lens arrays 321 and 322, a polarization conversion element 323, and a superimposing lens 324, a color separation optical device 33, which has dichroic mirrors 331 and 332, and a reflecting mirror 333, a relay optical device 34, which has an incidence side lens 341, a relay lens 343, and reflecting mirrors 342 and 344, an optical device 35, which has three liquid crystal panels 351 as optical modulation devices, three incidence side polarizing plates 352, three exit side polarizing plates 353, and a dichroic prism 354 as a color synthesis optical device, and a projection lens 36 as a projection optical device which projects an image formed by the optical device 35.

Then, with the optical unit 3, by means of the heretofore described configuration, a luminous flux emitted from the light source device 31 and going through the illumination optical device 32 is separated into three color lights of R, B, and G by the color separation optical device 33. Also, the individual separated color lights are modulated in accordance with the image information, by the respective liquid crystal panels 351. The individual modulated color lights are synthesized into an image by the prism 354, and the image is projected onto the screen by the projection lens 36.

As the heretofore described individual members 31 to 36 are utilized as optical systems of each kind of general projector, a specific description will be omitted.

Configuration of Remote Control Light Receiving Section

The remote control light receiving section 4, being disposed on the rear side of the front section 23, as shown in FIG. 2, receives the light signal emitted from the remote controller and passing through the light receiving window 232 (FIG. 1), and transmits a signal corresponding to the received light signal to the control device.

Then, the control device controls operations of internal component members in response to the received signal.

Configuration of Lens Protection Device

Figure 3:
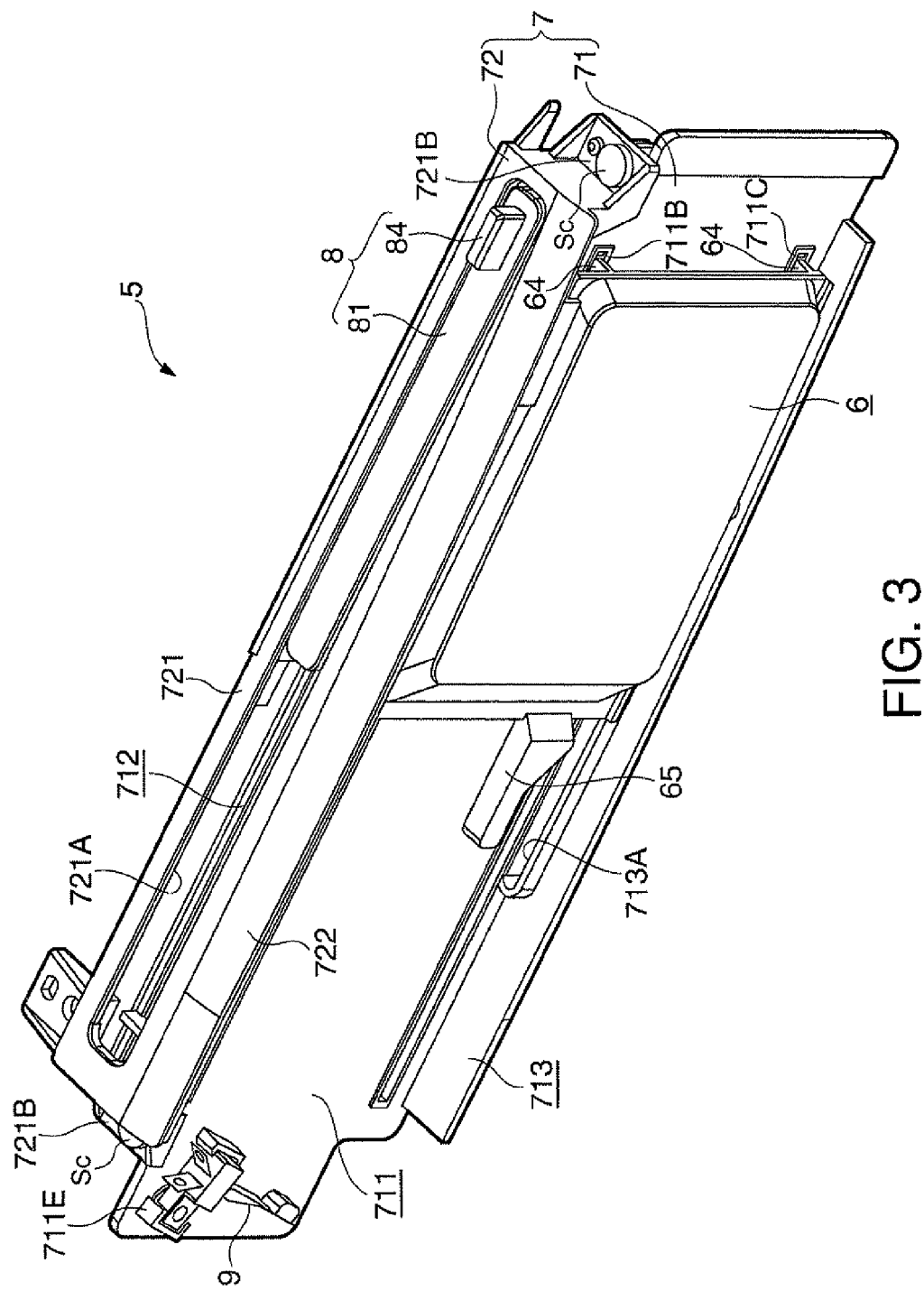
FIG. 3 shows a configuration of a lens protection device of the embodiment.
Figure 4:
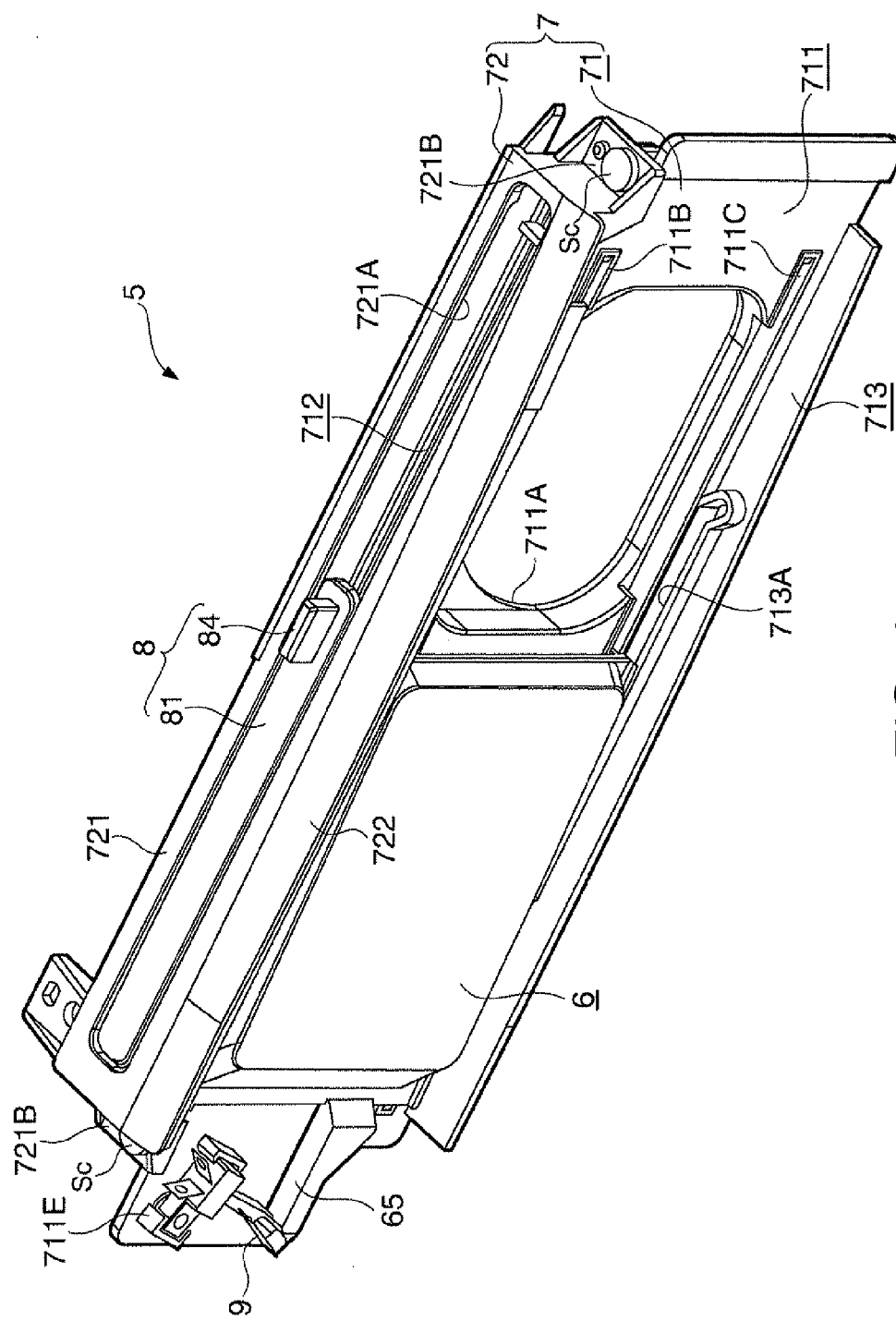
FIG. 4 shows a configuration of the lens protection device of the embodiment.

FIGS. 3 and 4 show a configuration of the lens protection device 5. Specifically, FIG. 3 is a perspective view of a condition in which a shutter 6 is positioned in a closed position, as seen from the upper front side, while FIG. 4 is a perspective view of a condition in which the shutter 6 is positioned in an open position, as seen from the upper front side.

The lens protection device 5, being disposed between the projection lens 36 and the front section 23 of the exterior housing 2, as shown in FIG. 2, is a device which opens and closes the image opening section 231 in response to an operation by a user.

Then, the lens protection device 5, by closing the image opening section 231, protects the projection lens 36 disposed inside the exterior housing 2. Also, the lens protection device 5, by opening the image opening section 231, causes the projection lens 36 to be exposed through the image opening section 231, and the projector 1 is set in a usable condition.

The lens protection device 5 includes the shutter 6, a support member 7, the operating member 8, and a position detection member 9, as shown in FIG. 3 or 4.

Configuration of Shutter

Figure 5A:
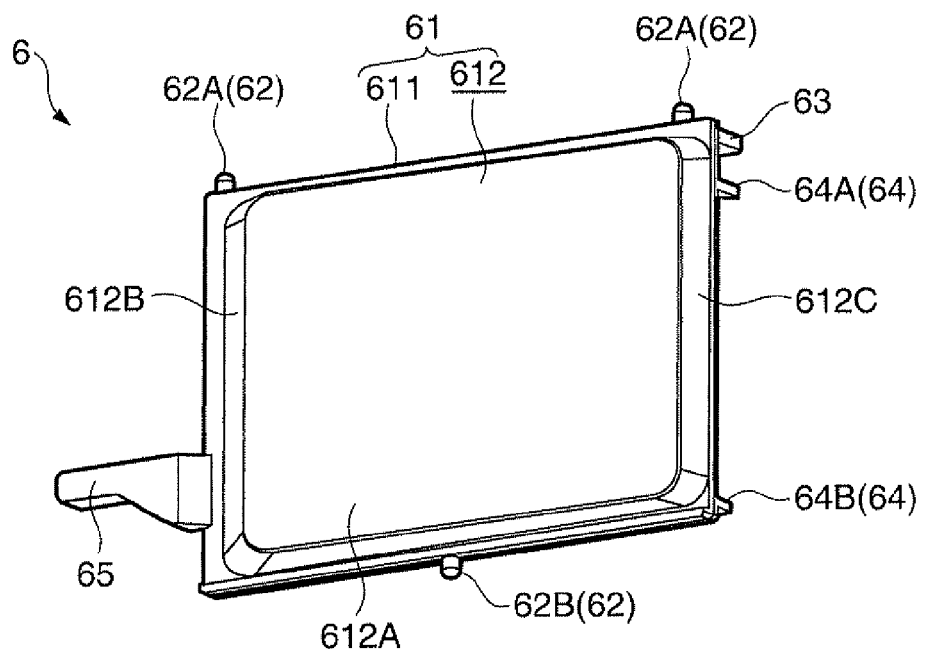
FIGS. 5A and 5B show a configuration of a shutter of the embodiment.
Figure 5B:
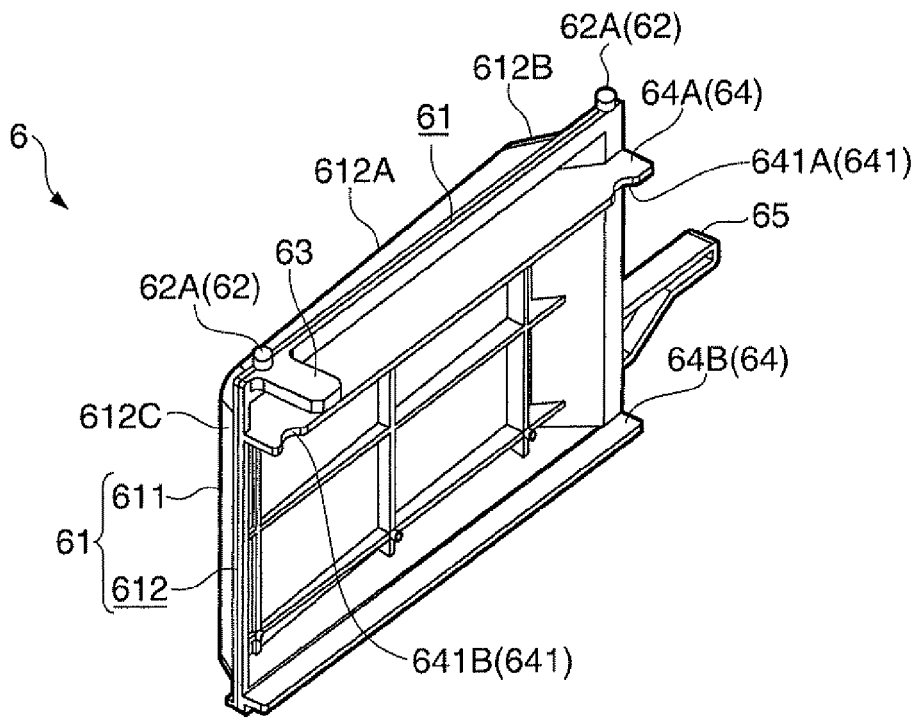

FIGS. 5A and 5B show a configuration of the shutter 6. Specifically, FIG. 5A is a perspective view of the shutter 6, as seen from the front side, while FIG. 5B is a perspective view of the shutter 6, as seen from the back side (rear side).

The shutter 6 is a member configured to close the image opening section 231. The shutter 6 includes a shutter main body 61, first engagement protrusions 62, a second engagement protrusion 63, guide rails 64, and a detection protrusion 65, as shown in FIGS. 5A and 5B.

The shutter main body 61, being configured in such a way that the central portion of a rectangular plate body 611, which is larger than the outer shape of the image opening section 231, bulges in a hollowed shape toward the front side, has a bulging section 612 on the front side end face of the plate body 611.

A leading end portion 612A of the bulging section 612, having a rectangular shape in a plan view, is formed in an approximately flat form. Also, the leading end portion 612A is formed in such a way as to have approximately the same shape as the image opening section 231.

That is, the leading end portion 612 is tilted in such a way as to go toward the back side from the left to the right, in the same way as the image opening section 231.

Also, a left side sidewall 612B of the leading end portion 612A of the bulging section 612 is tilted in such a way that a position of connection with the plate body 611 is shifted to the left side of a position of connection with the leading end portion 612A.

A right side sidewall 612C, contrary to the left side sidewall 612B, is tilted in such a way that a position of connection with the plate body 611 is shifted to the right side of a position of connection with the leading end portion 612A.

The first engagement protrusions 62, being portions which make engagement with the support member 7, protrude along a vertical axis from the outer edge of the plate body 611.

In the embodiment, three first engagement protrusions 62 are provided: two upper side engagement protrusions 62A (FIGS. 5A and 5B), which protrude upward from left and right sides of the upper end edge of the plate body 611, respectively, and a lower side engagement protrusion 62B (FIG. 5A), which protrudes downward from an approximately central portion in the left-right direction of the lower end edge of the plate body 611.

The first engagement protrusions 62 having the same shape, the leading end portions of which are formed in a hemispheric shape.

The second engagement protrusion 63, being a portion configured to make engagement with the operating member 8, protrudes to the back side, approximately parallel to a horizontal plane, from the upper right side of the back side end face of the plate body 611.

The guide rails 64, being portions which make engagement with the support member 7, are formed in a plate-like shape which, protruding from the back surface of the shutter main body 61, extends in the left-right direction parallel to the horizontal plane.

In the embodiment, two guide rails 64 are provided at the back of the shutter main body 61: an upper side rail 64A positioned on the upper side, and a lower side rail 64B positioned on the lower side.

The upper side rail 64A is formed below the second engagement protrusion 63.

In the back side end edge of the upper side rail 64A, as shown in FIG. 5B, notches 641 cut out into a semicircular shape are formed on each of left and right sides.

Hereafter, of the two notches 641, the left side notch 641 will be described as a closed position notch 641A, and the right side notch 641 will be described as an open position notch 641B.

The detection protrusion 65, being a portion used when detecting a position of the shutter 6, protrudes to the left side from the lower side of the left side edge of the plate body 611.
Configuration of Support Member The support member 7 supports the shutter 6 in such a way that the shutter 6 can move to the closed position (FIG. 3) in which it closes the image opening section 231, and to the open position (FIG. 4) in which it opens the image opening section 231, causing the projection lens 36 to be exposed through the image opening section 231. The support member 7 includes a lower side support member 71 and an upper side support member 72, as shown in FIGS. 3 and 4.

Figure 6:
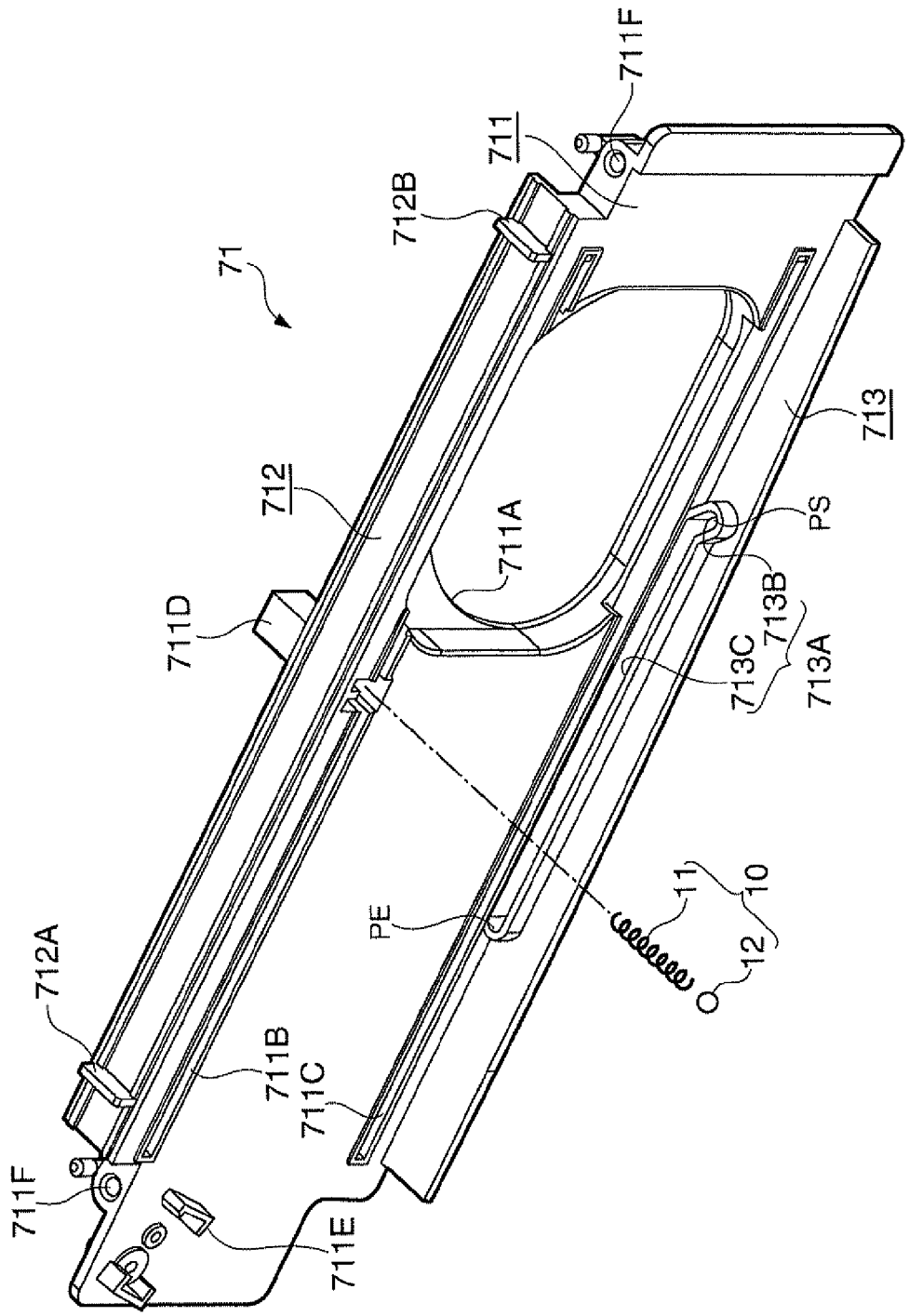
FIG. 6 shows a perspective view showing a configuration of a lower side support member of the embodiment.

FIG. 6 is a perspective view showing a configuration of the lower side support member 71. Specifically, FIG. 6 is a perspective view of the lower side support member 71, as seen from the upper front side.

The lower side support member 71 is a member which, being fixed to the exterior housing 2, supports the whole of the lens projection device 5. The lower side support member 71 includes a substrate 711, a mounting section 712, and a lower side horizontal section 713, as shown in FIG. 6.

The substrate 711 is configured of a plate body of a rectangular shape in a plan view, the plate surface of which is perpendicular to the direction of projection from the projection lens 36.

A second image opening section 711A having approximately the same opening area as the image opening section 231 is formed in a position of the substrate 711 opposed to the image opening section 231, as shown in FIG. 4 or 6.

That is, the second image opening section 711A is an opening which allows a light source projected from the projection lens 36 to pass through in the same way as the image opening section 231.

Also, as shown in FIG. 6, an upper side guide slit 711B and lower side guide slit 711C extending in the left-right direction are formed on both upper and lower sides of the substrate 711 respectively.

The pair of guide slits 711B and 711C are portions through which each of the pair of guide rails 64 of the shutter 6 is inserted, as shown in FIG. 3, and which guide a movement of the shutter 6.

Furthermore, a click mechanism housing section 711D, the inside of which communicates with the upper side guide slit 711B, and which bulges in a hollowed shape toward the back side, is provided in an approximately central portion in the left-right direction on the upper side of the substrate 711.

The click mechanism housing section 711D is a portion which houses a click mechanism 10, as shown in FIG. 6.

Herein, the click mechanism 10 is a mechanism configured to apply a vibration to the shutter 6 when the shutter 6 is positioned in the closed position (FIG. 3) or open position (FIG. 4), allowing the user who has operated the shutter 6 (operating member 8) to recognize that the shutter 6 has been positioned in the closed position or open position.

The click mechanism 10 includes a coil spring 11 and a spherical abutment member 12, as shown in FIG. 6.

An operation of the click mechanism 10 will be described hereafter.

Also, as shown in FIG. 3, 4, or 6, a detection member installation section 711E for installing the position detection member 9 is provided on the upper left side of the front side end face of the substrate 711.

Figure 8:
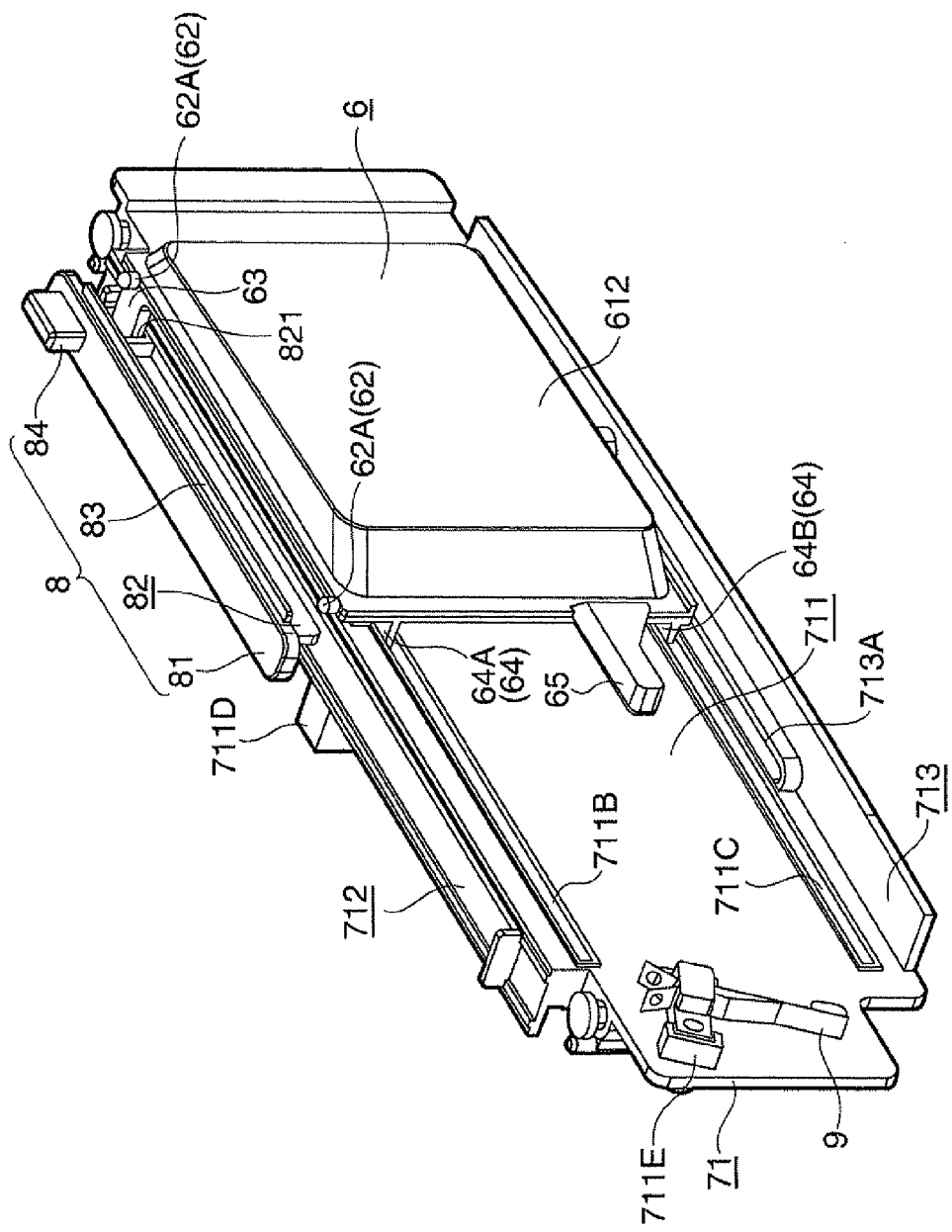
FIG. 8 shows a configuration of an operating member of the embodiment.

The mounting section 712, being provided at the upper end edge of the substrate 711, is a portion on which, as well as the operating member 8 being mounted, the operating member 8 slides (refer to FIG. 8). Then, the mounting section 712 is formed in a rectangular plate-like shape which, as well as protruding to the back side, parallel to the horizontal plane, from the upper end edge of the substrate 711, extends in the left-right direction along the upper end edge of the substrate 711.

As shown in FIG. 6, an open position limit section 712A and closed position limit section 712B are erected on both left and right sides of the upper surface of the mounting section 712 respectively.

The limit sections 712A and 712B, being formed in a plate-like shape extending in a front-back direction, are portions which limit a movement of the operating member 8.

The lower side horizontal section 713, being provided at the lower end edge of the substrate 711, as shown in FIG. 6, is a portion configured to guide a movement of the shutter 6. Then, the lower side horizontal section 713 is formed in a rectangular plate-like shape which, as well as protruding to the front side, parallel to the horizontal plane, from the lower end edge of the substrate 711, extends in the left-right direction along the lower end edge of the substrate 711.

As shown in FIG. 6, a lower side engagement groove 713A is formed on the upper surface of the lower side horizontal section 713.

The lower side engagement groove 713A is portion into which the lower side engagement protrusion 62B of the shutter 6 is inserted, and which makes engagement with the shutter 6.

The lower side engagement groove 713A is provided in such a way that a start end PS at which the lower side engagement protrusion 62B is positioned in the closed position is positioned to the front side of a finish end PE at which the lower side engagement protrusion 62B is positioned in the open position.

Specifically, the lower side engagement groove 713A is configured of a first groove section 713B extending to the back left side from the start end PS, and a second groove section 713C communicating with the first groove section 713B and extending in a horizontal direction to the finish end PE. Herein, the first groove section 713B and second groove section 713C communicate with each other in such a way as to form an obtuse angle with each other. Also, they are formed in such a way that the length of the first groove section 713B is smaller in dimension than the length of the second groove section 713C.

Figure 7:
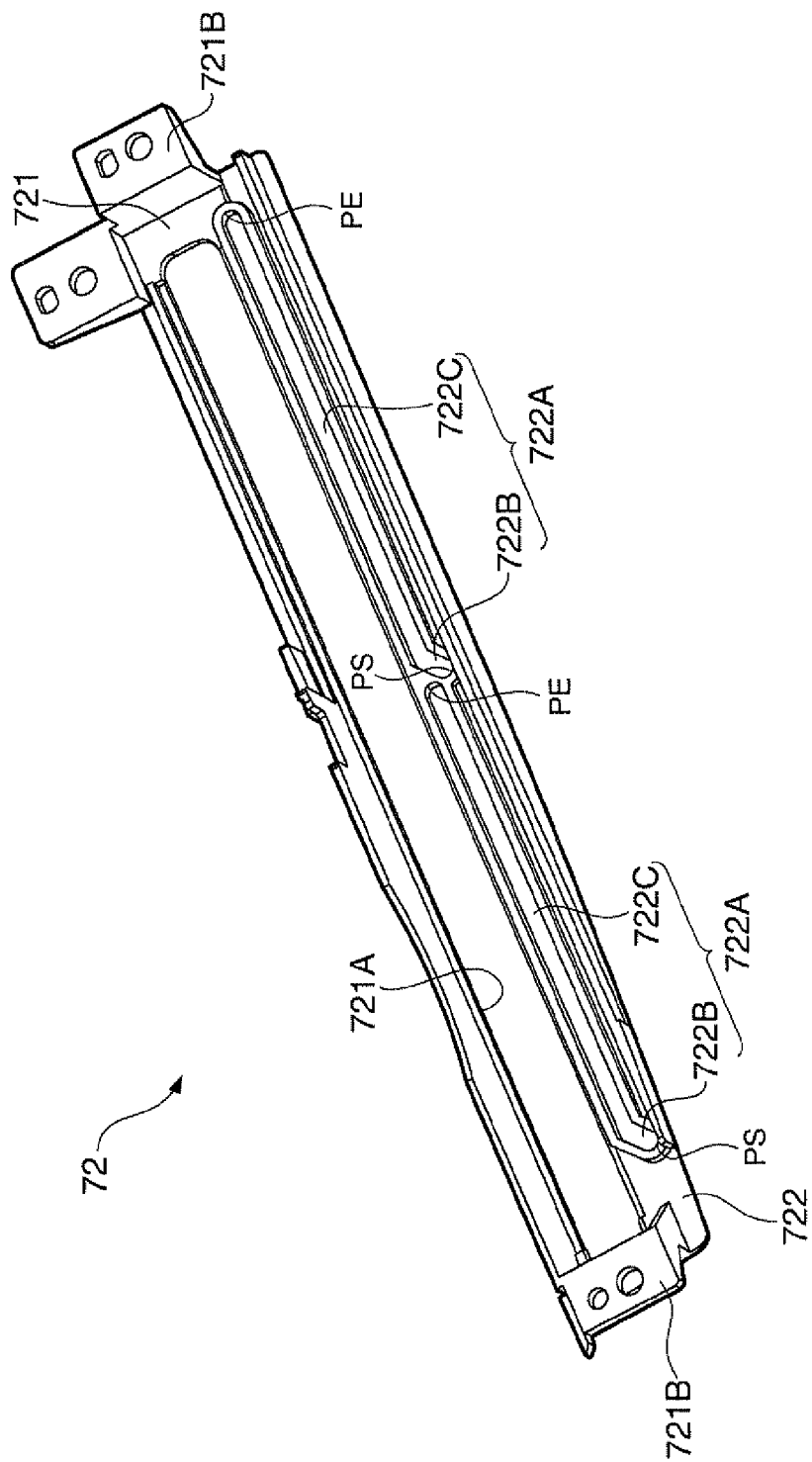
FIG. 7 shows a perspective view showing a configuration of an upper side support member of the embodiment.

FIG. 7 is a perspective view showing a configuration of the upper side support member 72. Specifically, FIG. 7 is a perspective view of the upper side support member 72, as seen from the lower front side.

The upper side support member 72, being fixed to the lower side support member 71, as shown in FIG. 3 or 4, is a portion which, as well as clamping the operating member 8 with the lower side support member 71 (mounting section 712) in such a way that the operating member 8 is movable, makes engagement with the shutter 6, and guides a movement of the shutter 6.

The upper side support member 72 includes a base section 721 and an upper side horizontal section 722, as shown in FIG. 7.

The base section 721, being configured of a plate body having the same rectangular shape as the mounting section 712, is disposed in such a way as to face the mounting section 712, as shown in FIG. 3 or 4. Then, the base section 721 clamps the operating member 8 with the mounting section 712 in such a way that the operating member 8 is movable.

As shown in FIG. 7, a slit 721A extending in the left-right direction is formed in the base section 721. Then, the base section 721, in a condition in which it clamps the operating member 8 with the mounting section 712 in such a way that the operating member 8 is movable, causes one portion of the operating member 8 to be exposed through the slit 721A.

Also, as shown in FIG. 7, fixing sections 721B, suspended downward, for fixing the upper side support member 72 to the lower side support member 71 are formed on left and right sides of the base section 721. Then, the upper side support member 72 is fixed to the lower side support member 71 by inserting fixing screws Sc (FIGS. 3 and 4) through each fixing section 721B, and screwing the fixing screws Sc into each screw hole 711F (FIG. 6) formed in the upper end edge of the substrate 711.

The upper side horizontal section 722 is formed in a rectangular plate-like shape which, as well as protruding to the front side, parallel to the horizontal plane, from the front side end edge of the base section 721, extends in the left-right direction along the front side end edge of the base section 721, as shown in FIG. 7. Then, the upper side horizontal section 722 is opposed to the lower side horizontal section 713 in the condition in which the upper side support member 72 is fixed to the lower side support member 71, as shown in FIG. 3 or 4.

As shown in FIG. 7, two upper side engagement grooves 722A are formed on the lower surface of the upper side horizontal section 722 in such a way that they are disposed side by side in the left-right direction.

The two upper side engagement grooves 722A, having the same shape, are portions into which each of the two upper side engagement protrusions 62A of the shutter 6 is inserted, and which make engagement with the shutter 6.

Each upper side engagement groove 722A, being provided in such a way that a start end PS at which the upper side engagement protrusion 62A is positioned in the closed position is positioned to the front side of a finish end PE at which the upper side engagement protrusion 62A is positioned in the open position, in the same way as the lower side engagement groove 713A, is configured of a first groove section 722B and second groove section 722C.

The heretofore described first engagement protrusions 62 and engagement grooves 722A and 713A correspond to an engagement structure according to some aspects of the invention.

Hereafter, for convenience of description, the engagement structure configured of the first engagement protrusions 62 and each engagement groove 722A and 713A will be described as a first engagement structure.

Configuration of Operating Member

FIG. 8 shows a configuration of the operating member 8. Specifically, FIG. 8 is a perspective view showing a condition in which the upper side support member 72 is removed from the condition of FIG. 3.

The operating member 8, one portion of which is exposed through the operation opening section 211 of the exterior housing 2, as shown in FIG. 1, is a portion which is operated by the user.

The operating member 8 includes a horizontal substrate 81, a slider 82, a ledge 83, and a knob 84, as shown in FIG. 8.

The horizontal substrate 81, being parallel to the horizontal plane, is configured of a rectangular plate body extending in the left-right direction.

As shown in FIG. 3 or 4, the horizontal substrate 81, as well as being formed so that the front-back direction width is approximately the same as the front-back direction width of the slit 721A of the upper side support member 72, is formed in such a way that the left-right direction length is smaller than the left-right direction length of the slit 721A.

The slider 82 is configured of a rectangular plate body which, protruding downward, perpendicular to the projection direction of the projection lens 36, from the lower surface of the horizontal substrate 81, extends in the left-right direction.

The leading end portion of the slider 82 is formed in a flat shape parallel to the horizontal plane. Then, the leading end portion of the slider 82 makes abutment with the upper surface of the mounting section 712 of the lower side support member 71, as shown in FIG. 8.

Also, as shown in FIG. 8, a through hole 821 through which the second engagement protrusion 63 of the shutter 6 is inserted is formed on the right side of the slider 82.

The through hole 821 is formed so that the left-right direction width is approximately the same as the left-right direction width of the second engagement protrusion 63.

The heretofore described second engagement protrusion 63 and through hole 821 correspond to a second engagement structure according to some aspects of the invention.

As shown in FIG. 8, the ledge 83 is formed in a plate-like shape which protruding to the front side, parallel to the horizontal plane, from the front side end edge of the horizontal substrate 81, extends in the left-right direction along the front side end edge of the horizontal substrate 81.

In FIG. 8, the back side end edge of the horizontal substrate 81, as it is in a hidden position, is not shown, but another ledge 83 is also provided at the back side end edge of the horizontal substrate 81.

The pair of ledges 83 are formed stepped downward from the upper surface of the horizontal substrate 81.

That is, when the upper side support member 72 is fixed to the lower side support member 71, as well as the horizontal substrate 81 being loosely fitted into the slit 721A, the pair of ledges 83 makes abutment with the periphery of the slit 721A, and the operating member 8 is clamped between the support members 71 and 72.

The knob 84, being erected on the right side of the upper surface of the horizontal substrate 81, as shown in FIG. 1 or 8, is a portion which is gripped by the user when the operating member 8 is operated via the operation opening section 211.

Configuration of Position Detection Member

The position detection member 9 detects a position of the shutter 6, and outputs a signal to the previously described control device.

In the embodiment, the position detection member 9, being configured of a normally closed type leaf switch, as shown in FIG. 3 or 4, constantly outputs the signal to the control device in a normal condition (the condition of FIG. 3).

Then, the position detection member 9, on the shutter 6 being positioned in the open position, is pressed by the detection protrusion 65 of the shutter 6 into an open condition, and stops outputting the signal to the control device as shown in FIG. 4.

That is, the control device, when the signal is not output from the position detection member 9, recognizes that the shutter 6 is positioned in the open position. Also, the control device, when the signal is output from the position detection member 9, recognizes that the shutter 6 is positioned in a position (for example, the closed position) other than the open position. Then, in this case, the control device implements a control of reducing a light intensity, such as by turning off the light source device 31.

Operation of Lens Protection Device

Next, a description will be given of an operation of the heretofore described lens protection device 5 (shutter 6).

Figure 9:
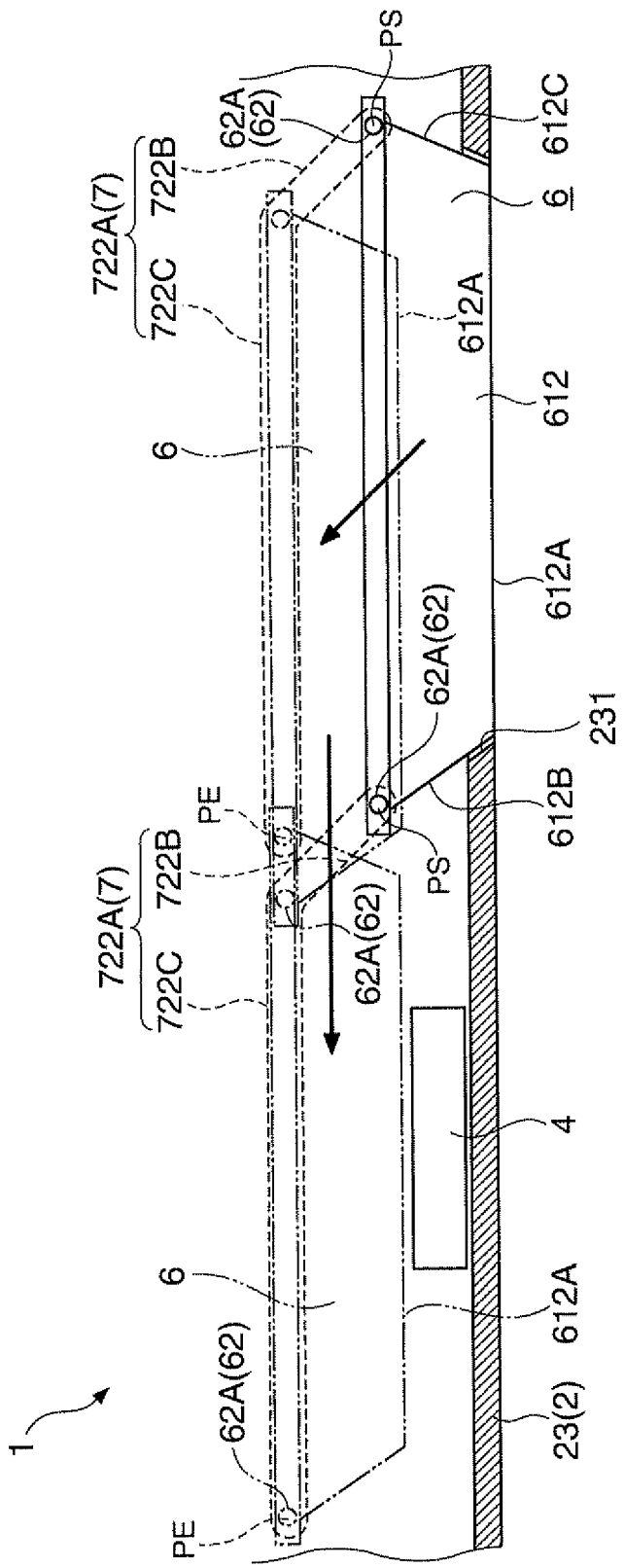
FIG. 9 is a schematic diagram for illustrating an operation of the shutter of the embodiment.

FIG. 9 is a schematic diagram for illustrating the operation of the shutter 6.

In FIG. 9, with regard to the shutter 6, the condition of FIG. 3 (the condition in which it is positioned in the closed position) is indicated by the solid line, the condition of FIG. 4 (the condition in which it is positioned in the open position) is indicated by the dashed line, and the condition in which it is positioned between the closed position and the open position is indicated by the two-dot chain line.

Also, in FIG. 9, of the upper side engagement grooves 722A and lower side engagement groove 713B, only the upper side engagement grooves 722A are shown. Then, hereafter, for convenience of description, a description will be given, based on the upper side engagement grooves 722A, of a movement of the shutter 6 (first engagement protrusions 62).

Firstly, in the condition of FIG. 3, as shown by the solid line in FIG. 9, the bulging section 612 is loosely fitted into the image opening section 231, and the leading end portion 612A of the bulging section 612 is positioned approximately flush with the outer surface of the front section 23.

Herein, the image opening section 231 is formed correspondingly to the shape of the sidewalls 612B and 612C of the bulging section 612 in such a way that the opening area increases gradually toward the back side, as shown in FIG. 9. That is, the edge of the image opening section 231 is of a tilted shape corresponding to the shape of the sidewalls of the bulging section 612.

Also, in the condition of FIG. 3, although a specific illustration is omitted, the operating member 8 is in a condition in which the right side end edge of the slider 82 is in abutment with the closed position limit section 712B, and a rightward movement is limited.

Furthermore, in the condition of FIG. 3, the click mechanism 10 is in a condition in which the abutment member 12 is in abutment with the closed position notch 641A due to a biasing force of the coil spring 11.

Then, on the user gripping the knob 84 of the operating member 8, and moving the operating member 8 to the left side from the condition of FIG. 3, as the second engagement protrusion 63 is inserted through the through hole 821 of the operating member 8, the shutter 6 interlocks with the leftward movement of the operating member 8.

Specifically, the shutter 6, in accordance with the leftward movement of the operating member 8, presses the abutment member 12 to the back side against the biasing force of the coil spring 11, and drives the abutment member 12 onto another area of the back side end edge of the upper side rail 64A from the closed position notch 641A. Then, the shutter 6, while the back side end edge of the upper side rail 64A is sliding on the abutment member 12, moves from the start end PS (closed position), along the first groove sections 7223, to the back left side, as shown by the two-dot chain line in FIG. 9.

Also, the shutter 6, in accordance with a further leftward movement of the operating member 8, while the back side end edge of the upper side rail 64A is sliding on the abutment member 12, moves to the left side along the second groove sections 722C. At this time, as the position of the leading end portion 612A of the shutter 6 is positioned to the back side of the remote control light receiving section 4, as shown by the two-dot chain line in FIG. 9, it does not happen that the shutter 6, when moving to the left side, interferes mechanically with the remote control light receiving section 4.

Then, on the left side end edge of the slider 82 of the operating member 8 coming into abutment with the open position limit section 712A, and the leftward movement being limited, the shutter 6 is positioned at the finish ends FE (open position) of the second groove sections 722C, as shown by the dashed line in FIG. 9.

Herein, when the shutter 6 is positioned at the finish ends PE, the click mechanism 10, by the abutment member 12 being fitted into the open position notch 641B from the back side end edge of the upper side rail 64A due to the biasing force of the coil spring 11, provides a vibration to the shutter 6. Then, the user recognizes the vibration provided to the shutter 6 via the operating member 8, and recognizes that the shutter 6 has been positioned in the open position.

As an operation of the shutter 6 from the condition of FIG. 4 to the condition of FIG. 3 is only the reverse of the heretofore described operation, a specific description will be omitted.

According to the heretofore described embodiment, there are the following advantages.

In the embodiment, by means of the first engagement structure provided on the shutter 6 and support member 7, the shutter 6, while the first engagement protrusions 62 are being guided by each engagement groove 722A and 713A, that is, by moving along each engagement groove 722A and 713A, opens and closes the image opening section 231. Herein, each engagement groove 722A and 713A is provided in such a way that the start end PS is positioned to the front side of the finish end PE.

By this means, the shutter 6, when it is positioned in the open position, is positioned to a back side, that is, on a side farther away from the front section 23, than in the condition in which it is positioned in the closed position. That is, as the shutter 6, when moving from the closed position to the open position, moves in such a way as to go away from the front section 23, is possible to realize a configuration such that, even in the event that the remote control light receiving section 4 is disposed on the rear surface of the front section 23, the shutter 6 does not interfere mechanically with the remote control light receiving section 4 when the shutter 6 moves.

Consequently, it not happening that a disposition position of the remote control light receiving section 4 is limited, it does not happen that a degree of freedom in designing the projector 1 decreases.

Also, by configuring in the way heretofore described, although there is a difference from the embodiment, it becomes possible to form an area of the front section 23 in which the image opening section 231 is formed into a shape bulging to the front side of the other area, and it is also possible to increase a degree of freedom in designing the exterior housing 2.

Also, the engagement grooves 722A and 713A are respectively configured of the first groove sections 722B and 713B, and second groove sections 722C and 713C, which form an obtuse angle and communicate with each other. By this means, the first engagement protrusions 62 move smoothly along each engagement groove 722A and 713A, meaning that the user can move the shutter 6 smoothly. Because of this, it is possible to enhance an operability of the shutter 6.

Furthermore, as the first groove sections 722B and 713E are formed in such a way as to be shorter than the second groove sections 722C and 713C, the shutter 6 moves from the closed position to a side away from the front section 23 at an early stage, then moves approximately parallel to the front section 23, and is positioned in the open position. By this means, even in the event that, on the rear surface of the front section 23, the remote control light receiving section 4 is disposed close to the image opening section 231, it does not happen that the shutter 6 interferes mechanically with the remote control light receiving section 4 when the shutter 6 moves. Consequently, it is possible to more preferably achieve the heretofore described advantage that the degree of freedom in designing the projector 1 does not decrease.

Also, as the shutter 6 includes the bulging section 612, in the condition in which the image opening section 231 is closed by the shutter 6, a condition is attained in which the bulging section 612 is loosely fitted in the image opening section 231. By this means, the edge portion of the image opening section 231 becoming difficult to be noticed due to the bulging section 612, it is possible to provide a configuration preferable in appearance.

Furthermore, as the leading end portion 612A of the bulging section 612 is configured of the heretofore described kind of surface, in the condition in which the image opening section 231 is closed by the shutter 6, the surface of the leading end portion 612A of the bulging section 612 loosely fitted in the image opening section 231, and the outer surface of the front section 23, are positioned approximately flush with each other. Because of this, it is possible to provide a configuration more preferable in appearance.

Also, the image opening section 231 is formed in such a way that the opening area increases toward the back side. By this means, even in the case in which the bulging section 612 is formed on the shutter 6, it does not happen that the bulging section 612 interferes mechanically with the edge portion of the image opening section 231 when the shutter 6 moves. Because of this, the user can move the shutter 6 smoothly.

Furthermore, the edge portion of the image opening section 231, and the sidewalls of the bulging section 612, are all configured to be tilted in the same way. By this means, it being possible, in the condition in which the image opening section 231 is closed by the shutter 6, to reduce a clearance between the edge portion of the image opening section 231 and the bulging section 612, it is possible to efficiently prevent particles such as dust from intruding from outside.

Also, by means of the second engagement structure provided in the shutter 6 and operating member 8, the shutter 6 interlocks with the movement of the operating member 8. Herein, the second engagement structure includes the second engagement protrusion 63 protruding in the projection direction, and the through hole 821 through which the second engagement protrusion 63 is inserted.

By this means, when the shutter 6 moves close to and away from the front section 23 (moves in the front-back direction) along with the movement to the closed position or open position, the second engagement protrusion 63 withdraws in the condition in which it is inserted through the through hole 821.

Consequently, by employing the second engagement structure, there is no need to employ a structure in which the operating member 8 moves in accordance with a movement of the shutter 6 (a movement close to and away from the front section 23 along with the movement to the closed position or open position). That is, with respect to the operating member 8, it being sufficient to employ a structure causing it to move linearly in the left-right direction, it is possible to achieve a structural simplification.

The invention not being limited to the previously described embodiment, a modification, improvement, and the like, within a scope in which it is possible to achieve an advantage of some aspects of the invention, are included in the invention.

In the previously described embodiment, as the first engagement structure, the first engagement protrusions 62 are provided on the shutter 6, and each engagement groove 722A and 713A is provided on the support member 7 but, not being limited to this, it is also acceptable to employ a structure in which, alternately, the first engagement protrusions are provided on the support member, and the engagement grooves are provided on the shutter.

In the same way, in the previously described embodiment, as the second engagement structure, the second engagement protrusion 63 is provided on the shutter 6, and the through hole 821 is provided in the operating member 8 but, not being limited to this, it is also acceptable to employ a structure in which, alternately, the second engagement protrusion is provided on the operating member, and the through hole is provided in the shutter.

In the previously described embodiment, the shape of each engagement groove 722A and 713A is not limited to the shape described in the previously described embodiment. It being sufficient that each engagement groove 722A and 713A is of any shape, provided that the start end PS is positioned to the front side of the finish end PE, for example, it is acceptable that each engagement groove 722A and 713A is of a shape extending in a straight line from the start end PS to the finish end PE, and it is also acceptable that each engagement groove 722A and 713A is of a shape extending in a curved line from the start end PS to the finish end PE.

In the previously described embodiment, each engagement groove 722A and 713A is formed on the support member 7 but, not being limited to this, it is also acceptable that they are formed on the top section 21 of the exterior housing 2 or the rear surface of the bottom section 22.

In the previously described embodiment, the remote control light receiving section 4 is disposed on the rear surface of the front section 23 but, not being limited to this, it is also acceptable that an imaging element, such as a charge coupled device (CCD), which images a projection image displayed on a projected surface such as a screen, a sensor which measures a distance to the projected surface, and the like, are disposed thereon.

In the previously described embodiment, the projector 1 is configured including the three liquid crystal panels 351, but the invention is not limited to this. That is, the invention can also be applied to a projector using two or less, or four or more, liquid crystal panels.

In the previously described embodiment, as the optical modulation devices, it is also acceptable to employ, apart from transmissive liquid crystal panels, reflective liquid crystal panels. Also, it is also acceptable to employ optical modulation devices of another configuration, provided that they modulate a luminous flux in accordance with image information, and form an image. The invention can also be applied to, for example, a projector using optical modulation devices other than liquid crystal, such as devices using a micromirror.

In the event of using these kinds of optical modulation device, it is possible to omit the luminous flux incidence side and luminous flux exit side polarizing plates 352 and 353.

In the previously described embodiment, only an example of a front projection type projector has been given, but the invention can also be applied to a rear type projector which, including a screen, carries out a projection from the rear side of the screen.

As the projector of some aspects of the invention can protect the projection optical device without the degree of design freedom decreasing, it can be utilized as a projector used for a presentation and home theater.

The present application claims priority from Japanese Patent Application No. 2009-027445 filed on Feb. 9, 2009, which is hereby incorporated by reference in its entirety.

What is claimed is:

1. A projector comprising:
a projection optical device configured to project an image;
an exterior housing that includes an image opening section for allowing the image projected from the projection optical device to pass through;
a shutter disposed inside the exterior housing, the shutter being configured to close the image opening section; and
a support member configured to support the shutter in either a closed position in which the image opening section is closed, or in an open position in which the image opening section is opened, the shutter and support member being provided with an engagement structure allowing the shutter to move along the support member, the engagement structure including:
   i) an engagement protrusion that:
      a) protrudes along a vertical axis, and b) is provided on one of the shutter and the support member, and
   ii) an engagement groove that:
      a) extends in a direction in which the shutter moves, b) is provided on the other of the shutter and the support member, c) receives the engagement protrusion thereby guiding a movement of the engagement protrusion, and d) is configured in such a way so as to cause the shutter to move both inward and away from the exterior housing, as the shutter moves from a closed position to an open wherein,
the engagement groove includes a first groove section and a second groove section configured to communicate with each other, and the second groove section is formed in such a way as to extend from a finish end, at which the engagement protrusion is positioned in the open position, so as to be approximately perpendicular to a projection direction of the projection optical device, the first groove section being formed in such a way as to: i) form an obtuse angle with respect to the second groove section, and ii) extend to the finish end.

2. The projector according to claim 1, wherein the engagement groove is formed in such a way that a length of the first groove section is shorter than a length of the second groove section.

3. The projector according to claim 1, wherein the shutter includes a bulging section that: i) bulges in the projection direction of the projection optical device, and ii) is fitted into the image opening section when the shutter is positioned in the closed position.

4. The projector according to claim 3, wherein the bulging section includes a leading end portion that is configured such that when the bulging section is fitted into the image opening section, the leading portion follows an outer surface of a sidewall of the exterior housing.

5. The projector according to claim 3, wherein the image opening section is formed in such a way that an opening area increases toward the inside of the exterior housing.

6. The projector according to claim 1, wherein the exterior housing includes an operation opening section configured to move the shutter, the operation opening section including an operating member that is: i) configured to be movable, ii) configured to be exposed to the outside through the operation opening section, and iii) configured to move the shutter from the outside, the shutter and the operating member being provided with: 1) a second engagement protrusion provided on one of the shutter and the operating member, which protrudes in the projection direction of the projection optical device, and 2) a second engagement structure including a through hole provided in another of the shutter and the operating member, the second engagement protrusion being inserted in the through hole.

* * * * *